United States Patent [19]

Pinnavaia et al.

[11] Patent Number: 5,079,203
[45] Date of Patent: Jan. 7, 1992

[54] POLYOXOMETALATE INTERCALATED LAYERED DOUBLE HYDROXIDES

[75] Inventors: Thomas J. Pinnavaia, East Lansing, Mich.; Taehyun Kwon, Ithaca, N.Y.; Emmanuel D. Dimotakis; Jayantha Amarasekera, both of East Lansing, Mich.

[73] Assignee: Board of Trustees operating Michigan State University, East Lansing, Mich.

[21] Appl. No.: 528,763

[22] Filed: May 25, 1990

[51] Int. Cl.$^5$ .................. B01J 20/02; B01J 21/16
[52] U.S. Cl. .................. 502/84; 502/80
[58] Field of Search .................. 502/84, 80

[56] References Cited

U.S. PATENT DOCUMENTS

| | | | |
|---|---|---|---|
| 3,796,792 | 9/1974 | Miyata et al. | 423/250 |
| 3,879,523 | 2/1975 | Miyata et al. | 423/250 |
| 3,879,525 | 4/1975 | Miyata et al. | 423/277 |
| 4,454,244 | 9/1984 | Woltermann | 502/202 |
| 4,621,070 | 7/1986 | Pinnavaia et al. | 502/63 |
| 4,665,044 | 1/1987 | Pinnavaia et al. | 502/84 |
| 4,665,045 | 6/1987 | Pinnavaia et al. | 502/84 |
| 4,774,212 | 12/1988 | Drezdon | 502/62 |

OTHER PUBLICATIONS

Pinnavaia, T. J., Science, 220, 365 (1983).
Pope, M. P., Heteropoly and Isopoly Oxometalates, Springer-Verlag, New York (1983).
S. L. Suib et al., in Solid State Ionics, 26 (1988), 77.
W. T. Reichle in Chemitech, 58 (1986).
Clays and Clay Minerals, 31, 305 (1983).
Pinnavaia and Kwon in J. Am. Chem. Soc., 110, 3653 (1988).

Primary Examiner—Carl F. Dees
Attorney, Agent, or Firm—Ian C. McLeod

[57] ABSTRACT

This disclosure describes the synthesis of layered double hydroxide compositions interlayered by polyoxometalate anions with Keggin-type structures and having the formula $[M_{1-x}{}^{II}M_x{}^{III}(OH)_2]A_{x/n}{}^{n-} \cdot yH_2O$, wherein, $M^{II}$ is a divalent metal and $M^{III}$ is a trivalent metal, A is an anionic polyoxometalate of negative charge n, x range between 0.12 to 0.8, and y is a positive number. The products exhibit well-defined XRD peaks corresponding to uniformly crystalline layered products with basal spacing values $\geq 14$ Å.

23 Claims, 7 Drawing Sheets

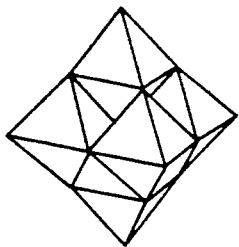
FIG. IA
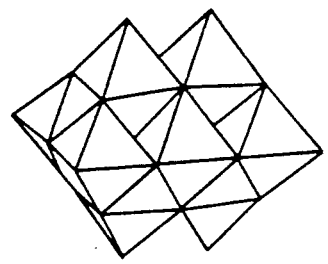
FIG. IB
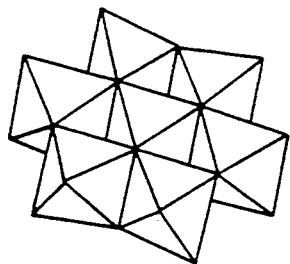
FIG. IC
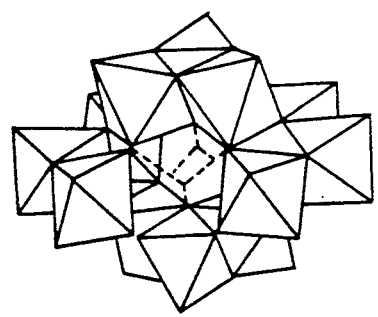
FIG. ID

α

β

α-$XM_{11}$

α-A-$XM_9$

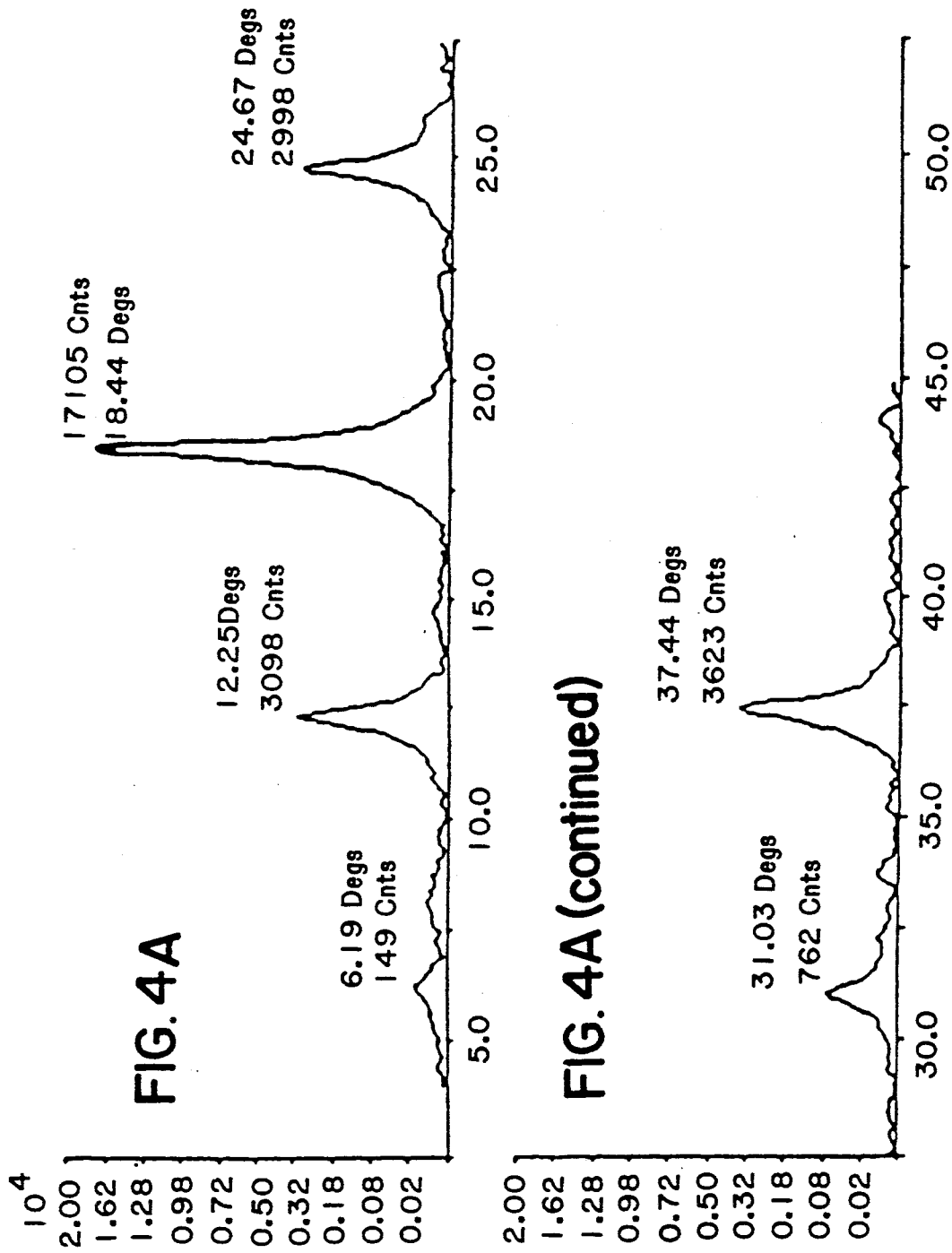

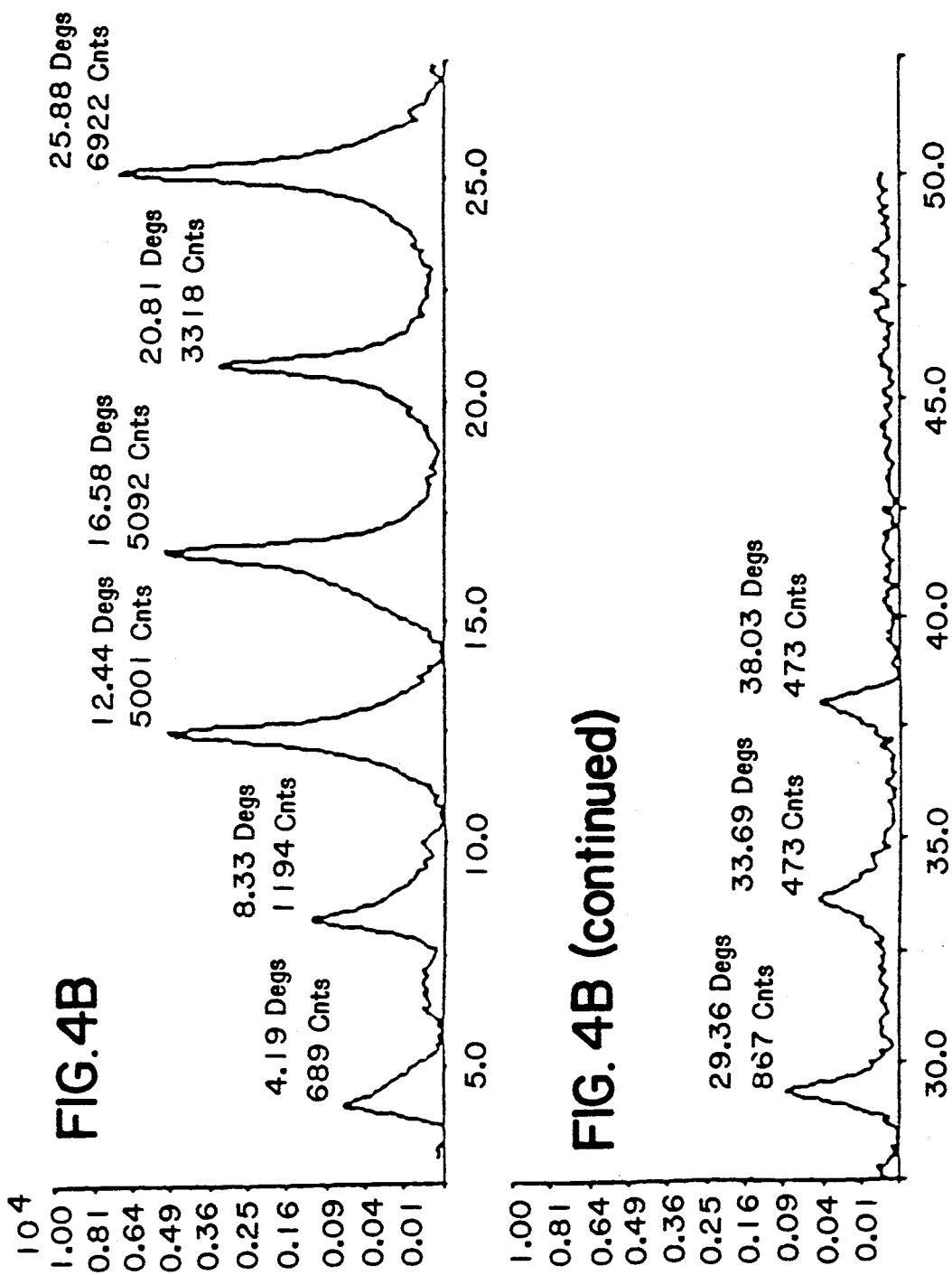

POLYOXOMETALATE INTERCALATED LAYERED DOUBLE HYDROXIDES

BACKGROUND OF THE INVENTION

This invention relates to the preparation of inorganic-oxometalate anion pillared clay compositions having the hydrotalcite type layered double hydroxide crystal structure and more particularly, anionic magnesium-aluminum and zinc-aluminum hydrotalcite clays containing large inorganic polyoxometalate anions (POMs) with Keggin-type structures intercalated between positively charged layers of metal hydroxides.

In recent years inorganic materials such as pillared smectite clays have been extensively used as catalytic materials in varying applications. These materials comprise negatively charged metal silicate sheets intercalated or pillared with hydrated cations. See Pinnavaia T. J., *Science*, 220, 365 (1983) for a review on these clays. The techniques for the intercalation of these clays are well-established and wide variety of cations may be incorporated into clays such as montmorillonite. Through the changes in the size of the pillar used to separate the sheets in the clay structure, the pore size of the pillared clay may be tailored to a particular application. Porous clay materials with high surface area have been prepared using organic or organometallic cations, metal chelates, polyoxometalate cations and transition metal halide clusters. Synthesis of several such systems has been disclosed in several patent literatures including the ones by Pinnavaia et. al., in U.S. Pat. Nos. 4,665,045; 4,665,044 and 4,621,070.

Polyoxometalate anions are another class of pillars that are suitable for lamellar solids. POMs containing early transition metals form water soluble anions with the general formula $[M_mO_y]^{p-}$ (isopolyanions) and $[X_xM_mO_y]^{q-}$ ($x<m$) (heteropolyanions). M is usually molybdenum or tungsten, less frequently vanadium, niobium or tantalum, or mixtures of these elements, in their highest oxidation states. For general review on polyoxometalate anions see, Pope, M. P., *Heteropoly and Isopoly Oxometalates*, Springer-Verlag, New York, (1983). POMs forms a structurally distinct class of complexes based predominantly, although not exclusively, upon quasi-octahedral-coordinated metal atoms ($MO_6$).

The simplest POMs have the hexametalate structure $M_6O_{19}$, where the oxygen atoms are in closed-packed arrangement with six $MO_6$ octahedra (FIG. 1A). Some of the isopoly anions include $[Nb_6O_{19}]^{8-}$, $[Ta_6O_{19}]^{8-}$, $[Mo_6O_{19}]^{2-}$ etc. The decavanadate anion $V_{10}O_{28}{}^{6-}$ has a related structure (FIG. 1B). Similarly, seven edge-shared octahedra form the Anderson-type structures (FIG. 1C) such as in $[Mo_2O_{24}]^{6-}$.

The most extensively studied POM compounds are those with Keggintype structures (FIG. 2). At least two isomers of the Keggin structure are known and FIG. 2A represents the α-form. The structure has overall $T_d$ symmetry and is based on a central $XO_4$ tetrahedron surrounded by twelve $MO_6$ octahedra arranged in four groups of three edge shared octahedra, $M_3O_{13}$. These groups ("$M_3$ triplets") are linked by several corners to each other and to the central $XO_4$ tetrahedron. Most of these types of Keggin ions are either molybdates or tungstates with the general formula $[XM_{12}O_{40}]^{n-}$ where M is Mo or W. For M=W, anions with X=H, B, Al, Ga(III), Si, Ge(IV), P(V), As(V), V(V), Cr(III), Fe(III), Co(III), Co(II), Cu(II), Cu(I), or Zn have been reported. Similarly for M=Mo anions with X=Si, Ge(IV), P(V), As(V), V(V), Ti(V), Zr(IV), In (III) is known. The second isomer has the β-Keggin structure, where one of the edge-shared $M_3O_{13}$ triplets of the α-structure rotated by 60° around the $C_3$ axis, thereby reduction of overall symmetry of the anion from $T_d$ to $C_{3v}$ (FIG. 2B). This structure is known for several tungstates (X=B, Si, Ge, $H_2$) and molybdates (X=Si, Ge, P, As).

Another class of POM are known in which a single $MO_6$ octahedron is deficient (FIG. 2C). These are known as lacunary (defect) Keggin POM anions and has the general structures such as $[XW_{11}O_{39}]^{n-}$ (represents as $XM_{11}$) where X=P, As, Si, Ge, B, Al, Ga, Fe(III), Co(III), Co(II), Zn, $H_2$, Sb(III), Bi(III); or $[XMo_{11}O_{39}]^{n-}$ where X=P, As, Si, Ge. These anions are stable in aqueous solutions and can be isolated in pure forms. Removal of a trigonal group of three adjacent $MO_6$ octahedra from the Keggin structure derive an another class of lacunary structures, which lead to $XM_9$ structure (FIG. 2D). The anion $[PW_9O_{34}]^{9-}$ represents one such example. The POM $[P_2W_{18}O_{62}]^{6-}$ consists of two $PW_9$ lacunary units fused into a cluster of virtual $D_{3h}$ symmetry (FIG. 2E). This unit is now known as the Dawson structure, and has two types of W atoms, six "polar" and twelve "equatorial". Removal of one $MO_6$ octahedra from this Dawson structure results in $[X_2W_{17}O_{61}]^{10-}$ type lacunary anions.

There are several other POMs which are closely related to Keggin type structure. For example, the anion $PV_{14}O_{42}{}^{9-}$ has a "bicapped Keggin" structure. In this POM twelve vanadium atoms form the usual Keggin structure and the remaining two V atoms occupy the pits on the Keggin molecule where a $C_4$ axis is passing, forming trigonal bipyramidal caps (FIG. 2F). The POM anion $NaP_5W_3O_{110}{}^{14-}$ has an approximate $D_{5h}$ symmetry and consists of a cyclic assembly of five $PW_6O_{22}$ units, each derived from the Keggin anion, $[PW_{12}O_{40}]^{3-}$, by removal of two sets of three corner-shared $WO_6$ octahedra which leads to the $PW_6$ moeity of the $P_2W_{18}$ (Dawson) anion. The sodium ion is located within the polyanion on the five fold axis and is 1.25 Å above the pseudomirror plane that contain the five phosphorous atoms.

The structures of heteropoly and isopoly oxometalates are not confined to the structure-types described above. There are several other variations. For example, the paratungstate anion $[H_2W_{12}O_{42}]^{10-}$ has a different arrangement of its twelve $MO_6$ octahedra than in a typical Keggin-type anion. Here, $MO_6$ octahedra are arranged in four groups of three edge-shared octahedra to form a central cavity. It has been suggested that the two protons are attached to the oxygen atoms inside the cavity and help stabilize the somewhat open structure by hydrogen-bonding (FIG. 1D).

Anionic POM compounds have been extensively used as heterogeneous catalysts for a broad variety of reactions. Examples include: oxidation of propylene and isobutylene to acrylic and methacrylic acids, ammoxidation of acrylonitrile; oxidation of aromatic hydrocarbons; olefin polymerization and epoxidation, and hydrodesulfurization. Thus negatively charged polyoxometalates would present a wider range of thermally stable, catalytically active pillars, provided a suitable host clay material is utilized.

Layered double hydroxides (LDHs), which are also referred to as anionic clays, represent a potentially important class of lamellar ionic solids for forming pillared derivatives with anionic POMs. These clays have positively charged layers of metal hydroxides between which are located anions and some water molecules. Most common LDHs are based on double hydroxides of such main group metals as Mg, and Al and transition metals such as Ni, Co, Cr, Zn and Fe etc. These clays have structures similar to brucite ($Mg(OH)_2$) in which the magnesium ions are octahedrally surrounded by hydroxyl groups with the resulting octahedra sharing edges to form infinite sheets. In the LDHs, some of the magnesium is isomorphously replaced by a trivalent ion, say $Al^{3+}$. The $Mg^{2+}$, $Al^{3+}$, $OH^-$ layers are then positively charged necessitating charge balancing by insertion of anions between the layers. One such clay is hydrotalcite in which the carbonate ion is the interstitial anion, and has the idealized unit cell formula $[Mg_6Al_2(OH)_{16}]CO_3.4H_2O$. However, the ratio of Mg/Al in hydrotalcite can vary between 1.7 and 4 and various other divalent and trivalent ions may be substituted for Mg and Al.

The preparation of LDHs is described in many prior art publications, particular reference being made to following review journal articles by S. L. Suib et. al., in *Solid State Ionics*, 26 (1988), 77 and W. T. Reichel in *CHEMITECH*, 58 (1986). An important aspect of the synthesis of these materials, which is particularly relevant to this disclosure, is the variation of the nature of the interstitial anion. The preparation of hydrotalcite-like materials with anions other than carbonate in pure form requires special procedures, because LDH incorporates carbonate in preference to other anions. Most of the time the smaller anions are introduced to the LDH structure via the precipitation method by using the desired anion solutions instead of carbonate. In this manner the carbonate anion in the hydrotalcite can be varied in synthesis by a large number of smaller anions such as $NO_3^-$, $Cl^-$, $OH^-$, $SO_4^{2-}$ etc. However, in these methods the synthesis has to be carried out in an anaerobic condition to prevent carbonate contamination from the atmospheric carbon dioxide. Miyata et. al. in U.S. Pat. Nos. 3,796,792, 3,879,523, and 3,879,525 describes hydrotalcite-like derivatives with anionic substitution including the smaller transition metal anions like $CrO_4^{2-}$, $MoO_4^{2-}$, and $Mo_2O_7^{2-}$.

The incorporation of larger anions in to LDH galleries, such as transition metal polyoxoanions, is not easy. This requires ion-exchange techniques subsequent to the LDH synthesis. The work by Miata et al., in *Clays and Clay Minerals*, 31, 305 (1983) indicated that the order of ion exchange capability of the gallery anions in hydrotalcite-like derivatives to be $OH^- < F^- < Cl^- < Br^- < NO_3^- < I^-$ and for divalent anions, $CO_3^{2-} < SO_4^{2-}$. Monovalent anions can be easily replaced by di- or poly-valent anions. Using this strategy, Pinnavaia and Kwon in *J. Am. Chem. Soc.*, 110, 3653 (1988) have demonstrated the pillaring of several polyoxometales including $V_{10}O_{28}^{6-}$ into the hydrotalcite structure containing Zn and Al metal ions in the layers. This pillared hydrotalcite-like material catalyzes the photooxidation of isopropanol to acetone.

U.S. Pat. No. 4,454,244 by Woltermann discloses the preparation of several polyoxometalate-LDH reaction products. However, no XRD or analytical data were given to support his assumption that the POMs were intercalated into the galleries of a crystalline LDH host. During the course of this work, we reproduced some of the synthetic procedures disclosed by Wolterman and found the products to be largely amorphous and impure (see the description of the invention below).

Recently, in U.S. Pat. No. 4,774,212 by Drezdon, the preparation of several Mg/Al hydrotalcite-like materials with gallery height about 12 Å containing transition metal polyoxoanions such as $V_{10}O_{26}^{6-}$, $Mo_7O_{24}^{6-}$ and $W_7O_{24}^{6-}$ with Anderson type structures (FIG. 1), is disclosed.

We disclose here processes for preparing Mg/Al and Zn/Al LDHs intercalated with transition metal containing large POM anions. The products isolated were pure and gave well-defined XRD peaks corresponding to uniformly crystalline layered double hydroxide products. The basal spacings of these materials agreed with POM-intercalated structures. The replacement of smaller anions, in hydrotalcite-like LDHs with much larger POMs, particularly with POMs with Keggin type structures, produce structures with increased gallery spacings of 14 Å or more. Such materials should exhibit intracrystalline microporosity accessible for the adsorption or diffusion of molecules into the structure from the outside. The accessibility of the intracrystalline structure to guest molecules should provide new opportunities for molecular seiving of gas mixtures and for heterogeneous catalysis.

SUMMARY OF INVENTION

This invention describes the synthesis of uniformly crystalline polyoxometalates intercalated layered double hydroxide compositions interlayered by polyoxometalate anions and having the formula $[M_{1-x}^{II}M_x^{III}(OH)_2]A_{x/n}^{n-}\cdot yH_2O$ and X-ray basal spacing values $\geq 14$ Å, wherein, $M^{II}$ is a divalent metal and $M^{III}$ is a trivalent metal, A is an anionic polyoxometalate of charge n, x range between 0.12 to 0.8, and y is a positive number.

Other objects and advantages of this invention will be apparent from the following detailed description and the drawings.

IN THE DRAWINGS

FIGS. 1A to 1D are perspective views showing the structures of some common POMs and in particular: 1A the structure of $[M_6O_{19}]^{n-}$; 1B structure of $V_{10}O_{28}^{6-}$; 1C structure of an Anderson type anion; 1D structure of $[H_2W_{12}O_{42}]^{10-}$. The positions of the protons are marked by open circles.

FIGS. 2A to 2F are perspective views showing Keggin and related structures and in particular isomers of the Keggin structure: 2A alpha-isomer: 2B beta-isomer, where one $M_3O_{13}$ group (shown unshaded) has been rotated by 60°; 2C. a lacunary structure derived from alpha-Keggin structure 2A by removal of one $MO_6$ octahedron to result $XM_{11}$ structure; 2D a lacunary structure derived from alpha-Keggin structure 2A by removal of three adjacent $MO_6$ octahedra to result $XM_9$ structure; 2E alpha-$[P_2W_{18}O_{62}]^{6-}$, the Dawson structure; 2F structure of $[PV_{14}O_{42}]^{9-}$ based on alpha-Keggin structure with two additional vanadium atoms occupying trans-related $VO_5$ trigonal bipyramids.

FIGS. 4A and 4B are graphs showing x-ray diffraction patterns for oriented film samples of $Zn_2Al$—LDH intercalated by 2A. Lacunary Keggin ion $BCu(II)W_{11}O_{39}^{7-}$ 2B POM anion $NaP_5W_{30}O_{110}^{14-}$.

Figure 5:
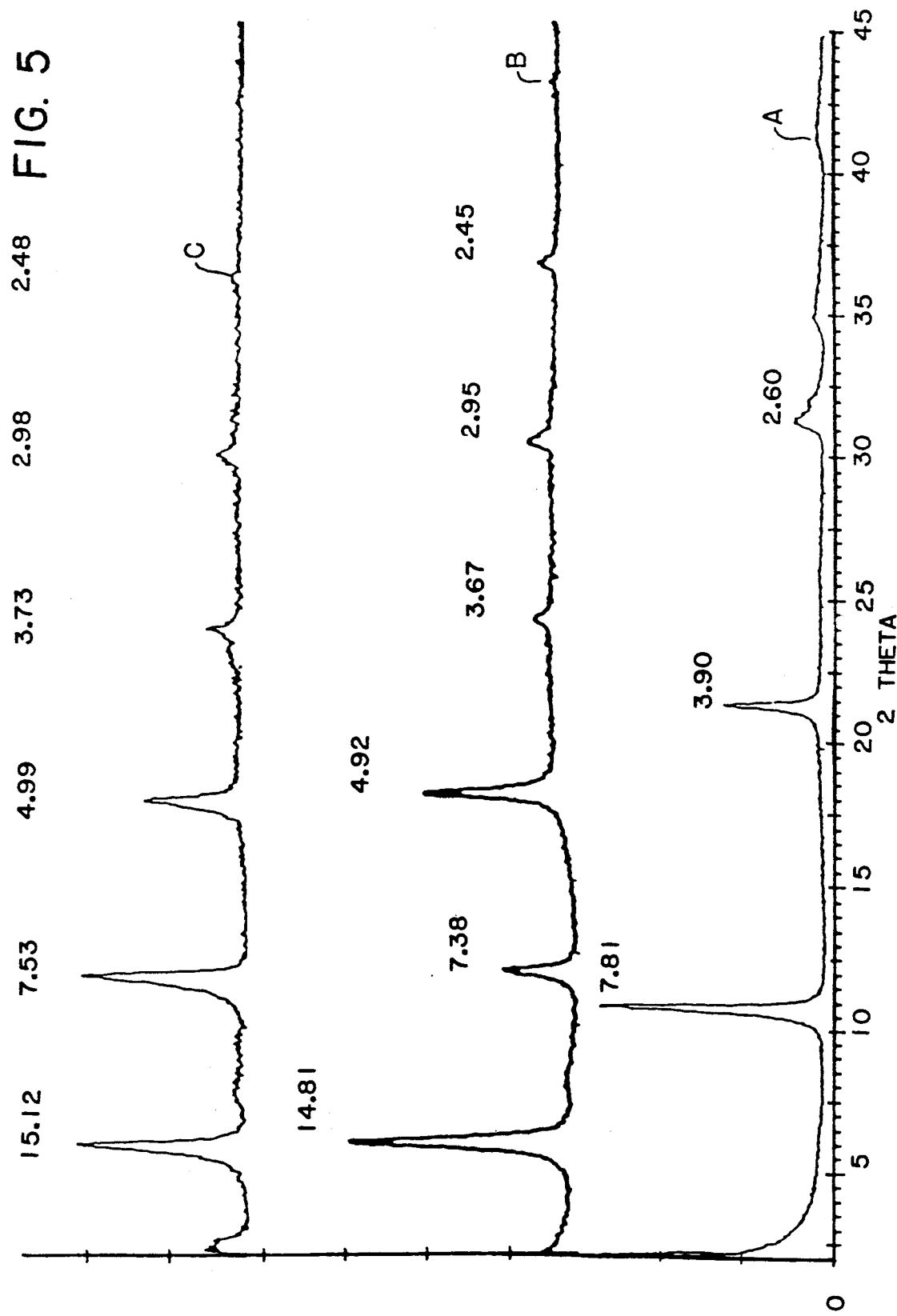

FIGS. 5A to 5C are graphs showing x-ray diffraction patterns for oriented film samples of $Mg_3Al$—LDH containing intercalated
5A $OH^-$
5B $H_2W_{12}O_{40}^{6-}$
5C $BV(IV)W_{11}O_{40}^{7-}$ FIGS. 6A to 6D show x-ray diffraction patterns for film samples of 6A $Zn_2Al$—$NO_3$ LDH and the POM-LDH reaction products formed by the reaction of the LDH with 6B $V_{10}O_{28}^{6-}$; 6C $PW_{12}O_{40}^{3-}$; and 6D $SiV_3W_9O_{40}^{7-}$ intercalates prepared according to the methods described in U.S. Pat. No. 4,454,244.

DESCRIPTION OF THE INVENTION

In certain embodiments described in this invention we describe the preparation of POM-intercalated crystalline Zn/Al—LDH compounds of the formula $[Zn_2Al(OH)_6]A_{1/n}{}^{n-}\cdot yH_2O$, where A is a POM anion of negative charge n, and y is a positive number. The incorporation of the guest POM anions into the Zn/Al LDH was carried out using LDHs of the type $Zn_2Al(OH)_6X$, [abbreviated as $Zn_2Al$—X] where $X^- = Cl^-$ or $NO_3^-$; and $NO_3^-$ is the preferred anion. The polyoxometalate anions selected contained at least one transition metal and possessed preferably a Keggin or lacunary Keggin-type structure or other POM anions with structures related to Keggin ions. The anion X in $Zn_2Al$—X is readily exchangeable with POM to give the desired POM intercalated $Zn_2Al$—LDH.

Figure 3:
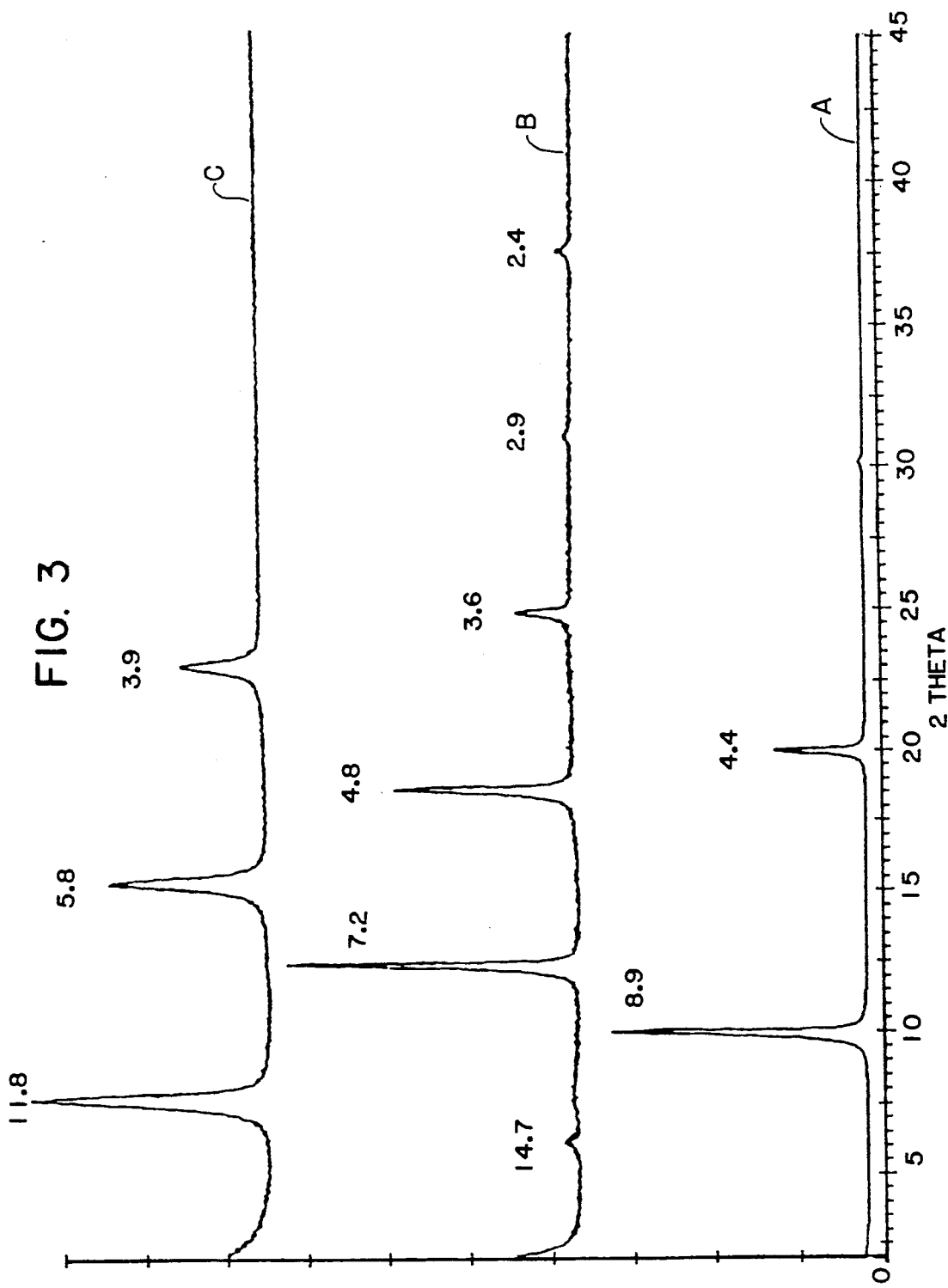
FIGS. 3A to 3C are graphs showing x-ray diffraction patterns for oriented film samples of
3A $Zn_2Al$—$NO_3$LDH and $Zn_2Al$—LDH intercalated with
3B Keggin ion alpha-$SiV_3W_9O_{40}^{7-}$
3C $V_{10}O_{28}^{6-}$.

The precursor LDHs $Zn_2Al(OH)_6Cl$ or $Zn_2Al(OH)_6NO_3$ were prepared using the induced precipitation method. Accordingly, a 0.1M $Al^{3+}$ solution containing the desired anion ($Cl^-$ or $NO_3^-$) was added to 1M NaOH until a pH of 7 was achieved. This white slurry $[Al(OH)_3]$ was then treated with a 0.3M $Zn^{2+}$ solution while maintaining the pH of the slurry between 6-7, and more preferably between 6.0-6.2. It is desirable to maintain the pH between 6-6.5 in this step to eliminate the formation of undesired products. The resultant slurry was then digested, preferably between 60°-100° C., for a period of 18 h to a day to obtain a good crystalline material. This crystallization process for the LDH-chloride or nitrate is important for the subsequent synthesis of well-crystalized pillared POM derivatives from these materials. Shorter durations of digestion resulted in amorphous materials, but extended digestions, for example, through a period of week, increased the crystallinity of the final products. All of the manipulations were carried out under an atmosphere of nitrogen gas and the solvents were degassed prior to the use to avoid possible contamination of $CO_3^{2-}$ from atmospheric $CO_2$. An oriented film sample of the $Zn_2Al$—$NO_3$ LDH reaction product showed a well-defined X-ray powder patterns corresponding to the LDH structure (FIG. 3A). Chemical analysis revealed that the Zn/Al ratio of this material to be 2. These $Cl^-$ and $NO_3^-$ precursor $Zn_2Al$—LDHs were stored as aqueous slurries for the subsequent anion exchange reactions with POM anions as discussed below.

Anion exchange reactions were carried out by adding an aqueous hot suspension of $[Zn_2Al(OH)_6]X\cdot zH_2O$ ($X = Cl^-$ $NO_3^-$) into an aqueous solution containing POM anions under anaerobic conditions. Preferably, a stoichiometric excess of the anion pillaring material over the hydrotalcite-type clay is used, for example, about 1 to about 2 molar excess, although a stoichiometric amount can also be used. The exchange reaction depends on the temperature and the pH of the solution. When the exchange reaction was carried out at ambient temperatures, the products obtained showed incomplete exchange. $Zn_2Al$—LDHs are amphoteric and stable only within the pH range of 5.8 to 10. Moreover, most POMs are unstable or undergo hydrolysis at high basic conditions. Therefore, exchange reactions were carried out under slight acidic conditions at a pH in the range of about 6 to 4.

Aqueous hot suspensions of $[Zn_2Al(OH)_6]NO_3\cdot 2H_2O$ were found to undergo complete intercalative ion exchange reactions with aqueous solutions of POM anions such as $\alpha$-$[H_2W_{12}O_{40}]^{6-}$, $\alpha$-$[SiV_3W_9O_{40}]^{7-}$, $BV(IV)W_{11}O_{40}^{7-}$, $SiFe(III)(SO_3)W_{11}O_{39}^{7-}$, with Keggin structure. These intercalated products were crystallographically well-ordered phases. For example X-ray diffraction patterns for oriented film samples of the $Zn_2Al[\alpha$-$SiV_3W_9O_{40}^{7-}]$ reaction product show at least six orders of 001 harmonics corresponding to a basal spacing of 14.5 Å (FIG. 3A). If the thickness of the LDH layer is taken to be 4.8 Å, then the gallery height is 9.7 Å, in accordance with the expected size of the Keggin ion. Similarly, POM anions such as $PMo_2W_9O_{39}^{7-}$, $BCo(II)W_{11}O_{39}^{7-}$, $BCu(II)W_{11}O_{39}^{7-}$, $SiW_{11}O_{39}^{8-}$, $BW_{11}O_{39}^{9-}$, $PW_9O_{34}^{9-}$, with lacunary (defect) Keggin structure can be intercalated in $Zn_2Al$—LDH structure to give pure products with basal spacings around 14 Å. Furthermore, robust POMs with fused Keggin-type structures such as $H_2W_{12}O_{42}^{10-}$ (FIG. 1D), $PV_{14}O_{42}^{9-}$ (FIG. 2E), $NaP_5W_{30}O_{110}^{14-}$ also readily undergo intercalation to give pure crystalline products.

The anions with lower charge, for example a charge less than 7-, such as $[PW_{12}O_{40}]^{3-}$ and $[SiW_{12}O_{40}]^{4-}$ show no ion exchange whereas, intermediate anions show partial intercalation (e.g. $[PCuW_{11}O_{39}(H_2O)]^{5-}$). Partial intercalation also was observed with several POMs with 6-charge such as $BV(v)W_{11}O_{40}^{6-}$, $BCo(III)W_{11}O_{39}^{6-}$ and $PV_3W_9O_{40}^{6-}$. X-ray diffraction patterns of these materials showed the presence of small amounts of non-intercalated starting material $Zn_2Al$—$NO_3$, along with intercalated product. However, as described above, the anion $\alpha$-$[H_2W_{12}O_{40}]^{6-}$, showed complete intercalation. These observations can be explained considering the guest anion size and host layer charge density. If one assumes a triangular arrangement of Keggin ions with a 9.8 Å diameter in the LDH galleries, then the area needed to accommodate each ion is 83 Å². Since the area per unit layer charge for $[Zn_2Al(OH)_6]NO_3\cdot 2H_2O$ is 16.6 Å², Keggin ions with a charge less than 5- such as $[PW_{12}O_{40}]^{3-}$ and $[SiW_{12}O_{40}]^{4-}$, is spatially incapable of balancing the host layer charge and making their intercalation in the LDH structure impossible.

Figure 2A:
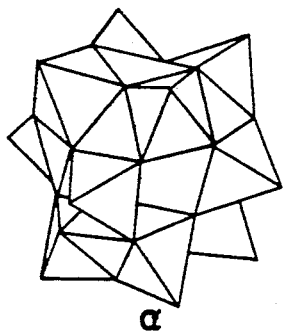
Figure 2B:
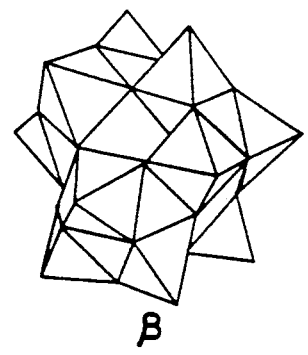
Figure 2C:
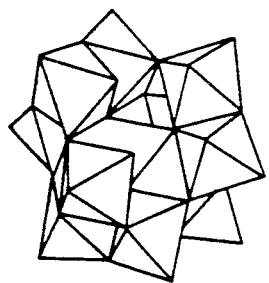
Figure 2D:
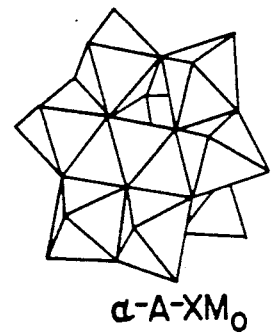
Figure 2E:
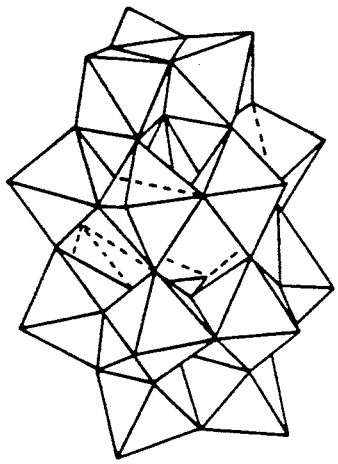
Figure 2F:
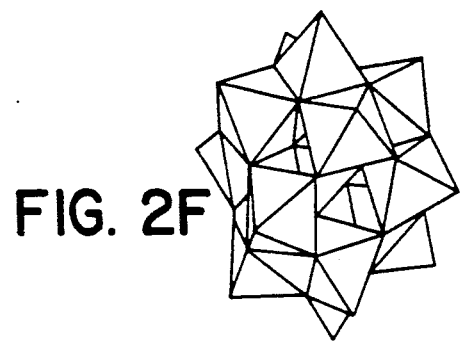

It is also apparent that the stacking symmetry of these Keggin ions plays a role in the intercalation reactions. The oxygen frame work of the POM anions with the $\alpha$-Keggin structure define a polyhedral form with $T_d$ symmetry. Thus, there are two plausible orientations for $\alpha$-isomers of Keggin structure in the LDH galleries. One orientation suggests the $C_3$ axis is orthogonal to the layers, and the other orientation the $C_2$ axis is orthogonal. The $C_3$ orthogonal orientation of the $\alpha$-isomer allow the hydroxyl groups in LDH to undergo H-bonding to six oxygens of the upper $M_3$ triad and to three terminal oxygens on the opposing side of the POM. Conversely, the $C_2$ orthogonal orientation permits 12 H-bonding interactions to 8 terminal and 4 bridging POM oxygen atoms. Thus, larger number of H-bonds should favor the $C_2$ orthogonal orientation. Accordingly, intercalation of $\beta$-isomers of Keggin type POM was slow and incomplete. For example, $\beta$-$[SiV_3W_9O_{40}]^{7-}$ POM anion which has a $C_{3v}$ oxygen framework symmetry, undergoes partial intercalation in $Zn_2Al$—LDHs. As discussed earlier, in the $\beta$-Keggin structure, one of the edge-shared $M_3O_{13}$ triplets of the $\alpha$-structure is rotated by 60° around the $C_3$ axis (FIG. 2B). Thus once the $\beta$-isomer is intercalated inside the LDH galleries with orientation similar to that of $\alpha$-isomer, it's preferred orientation is a one with $C_3$ axis inclined. In this orientation $\beta$-Keggin ion is capable of mimicking only half the H-bonding interaction encountered for a $C_2$ orthogonal orientation of $\alpha$-isomer. One face of the POM experiences guest-host interactions equivalent to those found for the $C_3$ orthogonal orientation of $\alpha$, but the H-bonding pattern on the opposite face of the POM is completely disrupted. As a result POM anions such as $\beta$-$SiW_{11}O_{39}^{8-}$, $\beta$-$SiV_3W_9O_{40}^{7-}$, with $\beta$-Keggin type structures undergo only partial intercalation.

The anions that posses structures other than Keggin- or lacunary Keggin-type also can be intercalated using this procedure. For example intercalation of smaller POM anions with Anderson type structures such as $V_{10}O_{28}^{6-}$ give crystalline products with basal spacing of about 12 Å (FIG. 3C).

In this invention we also describe the preparation of POM-intercalated, hydrotalcite-like Mg/Al LDH compounds of formula $[Mg_6Al_2(OH)_{16}](A^{n-})_{2/n} \cdot yH_2O$, where A is the anion of negative charge n and y is a positive number. The advantage of the method that we disclose here is the ability to begin with hydrotalcite, a readily accessible Mg/Al—LDH carbonate, and then to convert this material to a pillared derivative containing large POM anions. Hydrotalcites with different Mg/Al ratios are easy to make and their syntheses are widely known in the art. In addition, hydrotalcite is commercially available. Hydrotalcite used in this invention was prepared by the addition of stoichiometric amounts of mixed magnesium and aluminum nitrates as an aqueous solution to a solution of stoichiometric amounts of sodium hydroxide and carbonate at about 25°–30° C., with vigorous stirring over a several-hour period, producing a slurry. This slurry was then heated for about 18 hours at about 60°–75° C. in order to allow crystallization. After filtering the solids, and thorough washing and drying, the dry solids were recovered. This procedure is readily adaptable to variations in the Mg/Al ratio, although a Mg/Al ratio of 3:1 was used in this invention.

The hydrotalcite was then calcined to remove all of $CO_3^-$ anions from the structure. This heat treatment is a very important part of this synthesis and may be carried out between 400°–550° C., preferably at 500° C., in air, or preferably, an inert gas stream or even under vacuum. This heat treatment resulted in the formation of an amorphous magnesium-aluminum oxide solid solution. Although the conversion was complete in about three hours, the calcination was carried out for about 10–12 hours to ensure the removal of all carbonate anions from the hydrotalcite structure. Upon being slurried in degassed-deionized water under an inert atmosphere, this calcined product undergoes hydrolysis to reform the LDH structure with $OH^-$ ions in the gallery. The product isolated showed well defined X-ray diffraction patterns corresponding to the LDH structure with a basal spacings of 7.8 Å (FIG. 5A). Chemical analysis confirmed the hydrotalcite hydroxide structure. The calcining temperature of hydrotalcite is very critical to obtain the pure "reactive" LDH-OH form. At or below 400° C., the hydrotalcite decomposition process is slow and incomplete and results in residual $CO_3^{2-}$ anions. Above 600° C., the resulting metal oxide mixture begins to sinter and lose its ability to reform the LDH structure in aqueous solutions.

The $[Mg_3Al(OH)_8]OH \cdot yH_2O$ (referred to as $[Mg_3Al]$—OH) prepared in this manner was found to be reactive towards anion exchange reactions. The anion exchange reactions were carried out under anaerobic conditions by adding an aqueous suspension of $[Mg_3Al]$—OH to a vigorously stirred aqueous solution containing the desired gallery anion. Preferably, a stoichiometric excess of the POM anion is used, for example about a 1 to about 2 molar excess. The mode of addition is important at this stage. The addition of POM solutions to a $[Mg_3Al]$—OH slurry results in mixed products containing several crystalline phases. The mixed phases are presumed to result from the hydrolysis reaction of the POM and LDH. Adding the $[Mg_3Al]$—OH slurry drop-wise into the POM solution prevents hydrolysis, as well as the need for controlling the pH of the solutions. The resulting suspensions were stirred for about 30 min. at ambient temperatures (25°–30° C.), although the anion exchange reactions were completed within minutes. The POM-intercalated LDHs were recovered by filtration, washed with water, and dried in air at 120° C.

The gallery $OH^-$ ions in the $Mg_3Al$—OH LDH can easily be exchanged by a wide variety of anions, such as $CrO_4^{2-}$, $SO_4^{2-}$, $CO_3^{2-}$ etc or larger anions such as $V_{10}O_{28}^{6-}$, $W_7O_{24}^{6-}$ or much larger POM anions with Keggin-type structures such as $H_2W_{12}O_{40}^{6-}$, $BVW_{10}O_{40}^{7-}$, $SiV_3W_9O_{40}^{7-}$, etc., or lacunary structures such as $SiW_{11}O_{39}^{8-}$, $BCoW_{11}O_{39}^{7-}$, $BCuW_{11}O_{39}^{7-}$, etc. In general, the isolated products have the idealized formula $[Mg_6Al_2(OH)_{18}]A_{2/n}^{n-} \cdot zH_2O$ where A is the POM anion of negative charge n. The products isolated were pure and showed X-ray diffraction peaks corresponding to crystalline phases with well-defined basal spacings (Table 1). For example, $[Mg_6Al_2(OH)_{16}][H_2W_{12}O_{40}]_{\frac{1}{3}} \cdot zH_2O$, where the gallery anions are $H_2W_{12}O_{40}^{6-}$, showed a basal spacing of 14.8 Å with well defined 00l reflections (FIG. 5B). The basal spacing corresponded to gallery height of about 10 Å and with a LDH layer thickness of about 4.8 Å.

The $[Mg_3Al]$—OH LDH prepared according to this invention undergoes swelling in the presence of various alcohols, ethers, polyalcohols and polyethers which results in an increase in gallery height. For example, suspending the LDH-OH in 1:2 (v/v) $H_2O$:glycerol and flash drying at 190° C. for ten minutes affords a product containing a mixture of two expanded phases with basal spacings of 14.2 Å and 9.4 Å. These phases result from glycerol-swollen derivatives containing a multilayer and monolayer of glycerol, respectively. Further drying at 190° C. for 1.5 hr resulted in the conversion of the multilayer glycerol solvate to the monolayer form. These results unequivocally demonstrate that glycerol swells the hydroxide interlayers of the LDH.

We have utilized the swelling behavior of $[Mg_3Al]$-OH LDH to disclose a general and exceptionally convenient route to introduce POM anions into the LDH galleries. Our approach, as disclosed in this patent, utilizes a swelling agent and the swellable $[Mg_3Al]$-OH LDH precursor to enhance the accessibility of the intercrystalline gallery surfaces of the LDH for topotactic reaction. LDH intercalation compounds interlayered by POM anions are readily prepared by the ion exchange reaction of [Mg$_3$Al]-OH and POM. The [Mg$_3$Al]-OH LDH is slurried in glycerol: water preferably in 2:1 (v/v) ratio, and this solution is added dropwise to an aqueous solution containing the POM anion. This solution could contain much higher or lower amounts of glycerol with glycerol: water ratio in the range 1:1 to 4:1 (v/v). A stoichiometric excess of the POM anion over the hydrotalcite-like clay is used, for example about 1 to about 2 molar excess. The resulting slurry is stirred at 25° C. for a period of about 1 hr. After filtering the solids, and thorough washing and drying at 120° C., the POM-intercalated Mg/Al LDHs are recovered. The isolated product contained well-ordered crystalline POM intercalated-LDH phases and XRD patterns similar to the products discussed earlier (FIGS. 5B and 5C).

This process of incorporating large POM anions into hydrotalcite structure has several novel features. Most importantly, the anion exchange reactions do not require controlled pH conditions, and the methods are convenient and fast. Furthermore, all the products prepared according to this invention afford pure and completely intercalated crystalline products with basal spacings of 14 Å or higher with high surface area values (Table 1). Although not discussed here, all the materials were further characterized by NMR, IR and other techniques. The types of POMs that can be intercalated are not limited to the ones described in this invention. The processes described could be adapted for the intercalation of any suitable POM anion.

The preparation of materials prepared by the reaction of polyoxometalate anion with Zn/Al and Mg/Al-LDH has been disclosed in U.S. Pat. No. 4,774,212 by Drezdon. In this latter work pillaring by relatively small POMs with Anderson type structures such as $V_{10}O_{28}^{6-}$, $Mo_7O_{24}^{6-}$ and $W_7O_{24}^{6-}$ were disclosed. In the preparation of these materials, controlled acidic conditions and LDH precursors intercalated by dicarboxylate anions were used. Hydrotalcite-like materials were first interlayered by dicarboxylate anions to obtain organic anion derivatives with basal spacings about 14 Å. These dicarboxylate anion pillared LDHs were then treated with vanadates, molybdates or tungstates at controlled acidic pH conditions to intercalate $V_{10}O_{26}^{6-}$, $Mo_7O_{24}^{6-}$ and $W_7O_{24}^{6-}$ anions (FIG. 1), with basal spacings of about 12 Å. By following the teachings of our disclosure we can also intercalate these smaller ions into LDH structures (FIG. 3C). The emphasis of our invention was the synthesis of POM-intercalated LDHs that result in higher basal spacings of 14 Å or more. The polyoxometalates selected have Keggintype structures or related ones.

A second patent, U.S. Pat. No. 4,454,244 by Wolterman, also has claimed the preparation of several POM-LDH reaction products. The POMs used by Wolterman were mostly non-Keggin type anions such as $V_{10}O_{28}^{6-}$, $Mo_2O_7^{6-}$, $Ta_6O_{18}(OH)^{7-}$ etc. His starting materials were either the nitrates or chlorides of Zn/Al or Mg/Al—LDHs. These solid LDHs were slurried in solutions containing POM anions to obtain POM-containing products. However, no XRD or analytical data were given in the patent to support the presence of a pillared crystalline phase. The pillaring of a layered solid by a gallery ion requires that the product be crystalline with the host structure still intact following insertion of the guest. Depending on pH, however, the reaction of a LDH and a POM can lead to hydrolysis products that are amorphous non-pillared phases and to diffusely crystalline impurities. Thus, we have made several attempts as described below to characterize some of Wolterman's materials by following the teachings of his patent.

Figure 6:
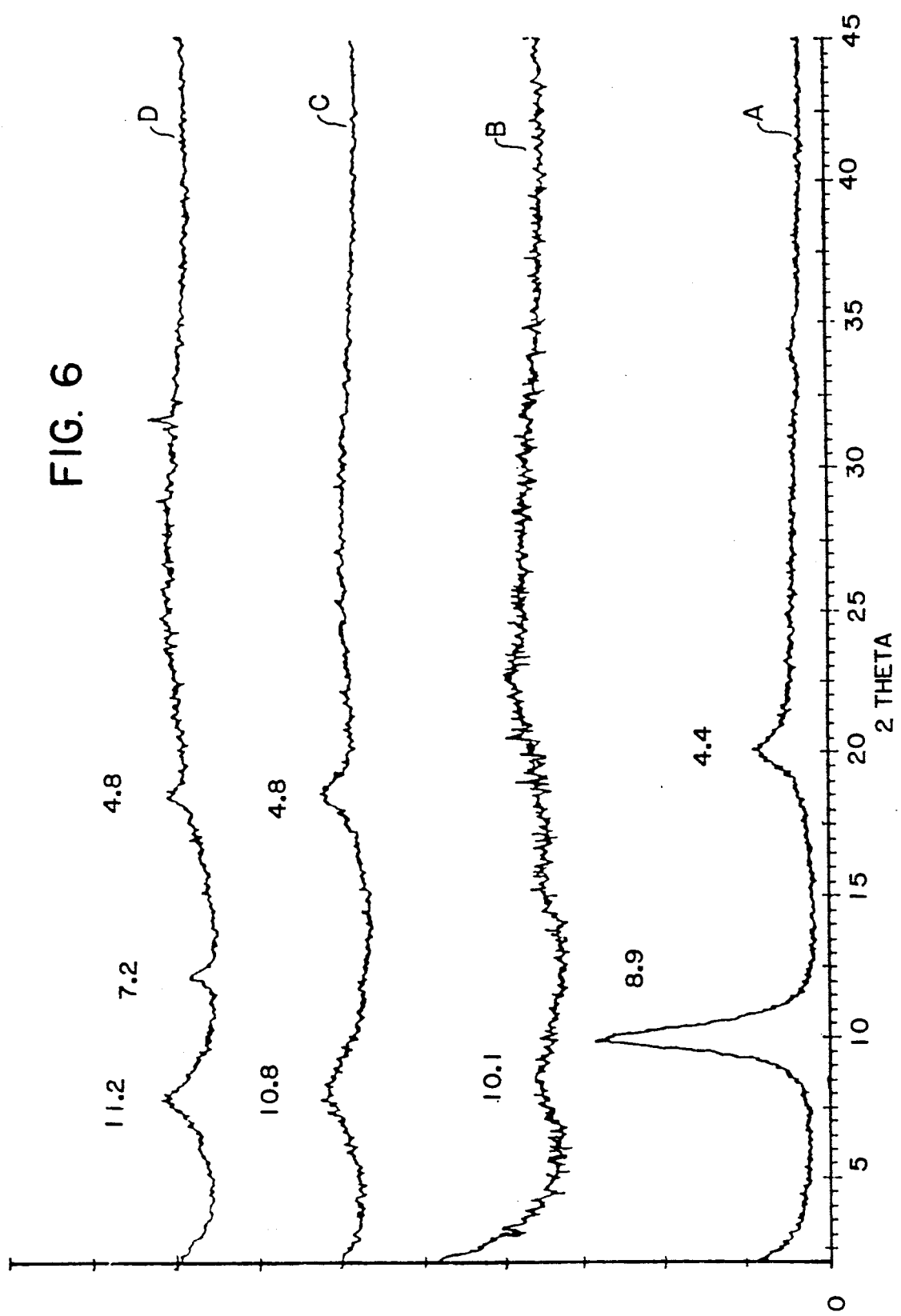

Following the conditions given in U.S. Pat. No. 4,454,244, we have found the reaction products to be largely X-ray amorphous and impure. For example, the yellow product said to be $V_{10}O_{28}^{6-}$ intercalated into a Zn$_2$Al—LDH was found to be X-ray amorphous as judged by the absence of distinct Bragg reflections. The X-ray diffraction pattern for this product is shown in FIG. 6B. The diffuse reflection near 10-11 Å are coincident with the reflections for poorly formed Mg or Al salts of the POM; they are not characteristic of a pillared LDH-$V_{10}O_{28}^{6-}$. In contrast, the $V_{10}O_{28}^{6-}$ intercalated Zn$_2$Al—LDH prepared according to our teachings as disclosed in this patent was an analytically pure, crystalline layered material. The XRD of the [Zn$_2$Al-(OH)$_6$]($V_{10}O_{28}$)$_{1/6}$·xH$_2$O product synthesized according to our teachings showed four orders of 001 harmonics corresponding to a basal spacing of 11.9 Å (FIG. 3C). This basal spacings corresponded to gallery heights of 7.1 Å (three oxygen planes) and to a $V_{10}O_{28}^{6-}$ orientation in which the C$_2$ axis is parallel to the host layers.

U.S. Pat. No. 4,454,244 further claimed the intercalation of four Keggin-type POM anions. These included, $PMo_{12}O_{40}^{3-}$, $PW_{12}O_{40}^{3-}$, $PMo_6V_6O_{40}^{5-}$ and $PMo_6W_6O_{40}^{5-}$. We believe that one of these anions, namely $PMo_6V_6O_{40}^{5-}$ is not known to the public. The known P, Mo, V containing Keggin-type POMs include $PMo_{11}VO_{40}^{4-}$, $PMo_{10}V_2O_{40}^{5-}$, and $PMo_9V_3O_{40}^{6-}$, but not $PMo_6V_6O_{40}^{5-}$. Moreover, a POM that contained six V, six Mo and one P, if it existed, should have an overall anion charge of minus 9, i.e., $PMo_6V_6O_{40}^{9-}$.

Our attempts to intercalate a Keggin-type polyoxometalate according to Wolterman's method also resulted in an X-ray amorphous materials. For example the reaction of, [PW$_{12}$O$_{40}$]$^{3-}$ with Zn$_2$Al—NO$_3$ according to procedures given in example 5 of U.S. Pat. No. 4,454,244 resulted in a material that was largely X-ray amorphous (FIG. 6C). Furthermore, the reaction of Zn$_2$Al—NO$_3$ and the Keggin ion α-SiV$_3$W$_9$O$_{40}^{7-}$, resulted in a product which showed diffuse scattering features (FIG. 6D) that were different from those observed for an authentic sample of pillared [Zn$_2$Al-(OH)$_6$](SiV$_3$W$_9$O$_{40}$)$_{1/7}$·xH$_2$O which we discussed earlier (cf., FIG. 3B). The diffuse XRD peaks in FIG. 6C and 6D were consistent with those observed for the Mg$^{2+}$ or Al$^{3+}$ salts of the POM.

We have also found that the products prepared according to Wolterman's teachings were not only amorphous and impure, but also exhibited physical properties different from an authentic, crystalline pillared LDH-POM. For example, the N$_2$ BET surface area of 155 m$^2$/g was observed for the crystalline α-SiV$_3$W$_9$O$_{40}^{7-}$ intercalated LDH prepared according to our teachings, when out gassing was done at 150° C. under vacuum. However a much lower surface area of 47 m$^2$/g was observed under analogous conditions for the amorphous material prepared according to Wolterman's method.

The above observations clearly demonstrate that the POM intercalated LDH materials we disclose here have compositions and properties different from the ones resulting from the work of Drezdon (U.S. Pat. No. 4,774,212) and the work of Wolterman (U.S. Pat. No. 4,454,244). We have presented in this disclosure, evidence to prove that our materials contain Keggin ions intercalated between LDH layers with retention of crystallinity. We believe that the Keggin-anion products claimed in U.S. Pat. No. 4,454,244 were amorphous and impure $M^{II}$ and $M^{III}$-POM salts outside the composition of matter represented by our materials.

On the basis of the known catalytic properties of POMs and hydrotalcites, the POM-intercalated hydrotalcites of this invention may be useful as catalysts for many industrially important processes including the oxidation of methane, sulfur oxides, nitrogen oxides etc., most likely at temperatures in the range of from 100°–1000° C.

The following examples will serve to illustrate certain embodiments of the herein disclosed invention. These examples should not, however, be construed as the limiting scope of the novel invention as there are many variations which may be made thereon without departing from the theme of the disclosed invention.

EXAMPLE 1

The preparation of $[Zn_2Al(OH)_6]X.zH_2O$ ($X=NO_3$, Cl) is described in this example.

All the manipulations were carried out under a $N_2$ atmosphere, and the water used as a solvent was pre-boiled for about 2 hours under $N_2$ before using.

To a 200-ml solution of 0.1M $Al(NO_3)_3.9H_2O$ was added a 1.0M solution of NaOH until the pH of the solution was 7. The white slurry was stirred for one hour, and a 200-ml solution of 0.3M $Zn(NO_3)_2$ was added drop-wise. The pH of the mixture was maintained at about 6.0, by adding NaOH. The resulting slurry was boiled for 24 h under a nitrogen atmosphere. (Boiling this suspension for one week produced products with high crystallinity.) The product, $[Zn_2Al(OH)_6]NO_3.zH_2O$, was washed several times with water by centrifugation, and stored as an aqueous slurry. A portion of the slurry was dried in air. The X-ray diffraction powder pattern of the dried solid corresponds in to a LDH structure with a basal spacing value of 8.9 Å. By employing a similar method, the Cl$^-$ derivative, $[Zn_2Al(OH)_6]Cl.zH_2O$, can be prepared using $AlCl_3$ and $MgCl_2$ as starting materials.

EXAMPLE 2

The general preparation of polyoxometalate-intercalated Zn/Al LDH materials is described in this example.

A boiling solution containing about a 5 mequiv. portion of a $Zn_2Al$—X (X=$NO_3$, or Cl) LDH slurry, prepared by the method in Example 1, was added dropwise to a stirred aqueous solution containing about 7.5 mequiv. of the desired polyoxometalate anion. After the additions were complete, the pH of the resultant slurries were adjusted to about 6 by adding dilute $HNO_3$ acid. The slurries were stirred for about 1 h and the solid products were isolated and washed thoroughly with water by centrifugation. The X-ray powder diffraction patterns of the dried solids correspond to hydrotalcite-like layered structures, with polyoxometalate anions in the gallery (FIGS. 3B, 3C, 4A and 4B). The basal spacings are given in Table 1. Chemical analyses conformed to the structure $Zn_2Al(OH)_6[POM^{n-}]_{1/n}.YH_2O$, where POM represent the polyoxometalate with a negative charge of n. The $N_2$ BET surface area for selected products outgassed at 150° C. were also determined (Table 1).

EXAMPLE 3

The preparation of a hydrotalcite-like [Mg$_3$Al]—$CO_3$ LDH is described in this example.

A solution of 12.8 g $Mg(NO_3)_2.6H_2O$ and 9.4 g $Al(NO_3)_3.9H_2O$ in 100 ml deionized water was added to a solution containing 14 ml 50% (w/w) NaOH and 5 g $Na_2CO_3$ (anhydr.) in 200 ml distilled water. The addition was carried out very slowly over a period of 90 min. with vigorous stirring. The resulting heavy slurry was heated at 65°±5° C. for 18 hours with good mixing. The mixture was then cooled to room temperature, and the precipitate was separated by centrifugation. The solid was washed several times with deionized water until the washings were free of salts and then dried in air. The X-ray diffraction pattern of the dried solid was indexed to hydrotalcite and the basal spacing was found to be 7.78 Å Chemical analysis show the Mg/Al ratio to be 3.2, very near the value expected for hydrotalcite with an idealized formula unit of $[Mg_3Al(OH)_8](CO_3)_{0.5}.2H_2O$.

EXAMPLE 4

The preparation from hydrotalcite of a [Mg$_3$Al]—OH LDH is described in this example.

A sample of synthetic hydrotalcite, prepared according to Example 3, was calcined at 500° C. for about 12 hours under a stream of $N_2$ gas. A 5-gram portion of this sample was pulverized and suspended in 200 ml of hot (65° C.) degassed deionized water to form a white slurry. The resulting slurry was then stirred vigorously at 65° C. for one hour under an atmosphere of nitrogen, to form the hydroxide derivative $[Mg_3Al(OH)_8]OH.xH_2O$. The resulting slurry was cooled to room temperature and the volume was adjusted to 250 ml with deionized water. The suspention was stored under $N_2$. The X-ray diffraction powder pattern of the dried solid sample corresponds to the hydrotalcite-like layered structure (FIG. 5A). The basal spacing was found to be 7.81 Å.

EXAMPLE 5

This example describe a general method for the preparation of polyoxometalate-intercalated Mg/Al—LDHs.

A 25-mequiv. portion of the [Mg$_3$Al]—OH LDH slurry prepared according to Example 4 was added drop-wise to a stirred aqueous solutions containing about 40 mequiv. of the desired polyoxometalate anion under an atmosphere of nitrogen. The resulting slurry was stirred at ambient temperature for about 15 min. and the solid product was isolated and washed thoroughly with water by centrifugation. The X-ray diffraction powder pattern of oriented film samples of the isolated products correspond to a hydrotalcite-like structure with intercalated polyoxometalates. The basal spacing are given in Table 1. Elemental analyses of the dried products revealed the ratio of POM to Al equivalents to be around 1.1 as expected for $[Mg_3Al(OH)_8][POM^{n-}]_{1/n}.xH_2O$, where POM is the polyoxometalate of negative charge n. The $N_2$ BET surface area for selected products outgassed at 150° C. were also determined (Table 1).

EXAMPLE 6

This example describes a second general method for preparing polyoxometalate-intercalated Mg/Al—LDHs.

A 25-mequiv. portion of the [Mg$_3$Al]—OH LDH slurry prepared according to Example 4 was diluted with two volumes of glycerol to obtain a slurry of LDH in 2:1 (v/v) glycerol:water. This slurry was then added drop-wise to stirred aqueous solutions containing about 40 mequiv. of polyoxometalate anion under an atmosphere of nitrogen. The resulting slurry was stirred at ambient temperatures for about 45 min. and the solid product was isolated and washed thoroughly with water by centrifugation. The X-ray diffraction powder patterns of the oriented film samples of the isolated products corresponded to a hydrotalcite-like structure with intercalated polyoxometalates (FIG. 5B and 5C). The basal spacings are given in Table 1. The observed basal spacings were greater than 14 Å, which corresponded to POM-intercalated products, since the LDH layer thickness is about 5 Å and POM height is about 9 Å. Elemental analyses of the dried products revealed ratio of POM to Al equivalents to be around 1.1, as expected for [Mg$_3$Al(OH)$_8$][POM$^{n-}$]$_{1/n}$·xH$_2$O, where POM is the polyoxometalate of negative charge n. The N$_2$ BET surface area for selected products outgassed at 150° C. were also determined (Table 1).

TABLE 1

Basal Spacings and Surface Areas of Polyoxometalate Pillared Layered Double Hydroxides of the Type [M$_{1-x}^{II}$M$_x^{III}$(OH)$_2$]A$_{x/n}^{n-}$·YH$_2$O

| Layer Metals | | Gallery Anion | Basal | Surface Area |
|---|---|---|---|---|
| M$^{II}$ | M$^{III}$ | A$^{n-}$ | Spacing | BET N$_2$(m$^2$/g) |
| Zn | Al | H$_2$W$_{12}$O$_{40}^{6-}$ | 14.7 | 63 |
| | | α-SiV$_3$W$_9$O$_{40}^{7-}$ | 14.5 | 155 |
| | | BV(IV)W$_{11}$O$_{40}^{7-}$ | 14.5 | — |
| | | SiFe(III)(SO$_3$)W$_{11}$O$_{39}^{7-}$ | 14.7 | — |
| | | PV$_{14}$O$_{42}^{9-}$ | 14.5 | — |
| | | H$_2$W$_{12}$O$_{42}^{10-}$ | 14.1 | 15 |
| | | NaP$_5$W$_{30}$O$_{110}^{14-}$ | 16.5 | 8 |
| | | PMo$_2$W$_9$O$_{39}^{7-}$ | 14.5 | — |
| | | BCo(II)W$_{11}$O$_{39}^{7-}$ | 14.3 | — |
| | | BCu(II)W$_{11}$O$_{39}^{7-}$ | 14.4 | — |
| | | SiW$_{11}$O$_{39}^{8-}$ | 14.7 | 211 |
| | | BW$_{11}$O$_{39}^{9-}$ | 14.5 | 96 |
| | | PW$_9$O$_{34}^{9-}$ | 14.5 | 26 |
| Mg | Al | H$_2$W$_{12}$O$_{40}^{6-}$ | 14.8 | 92 |
| | | α-SiV$_3$W$_9$O$_{40}^{7-}$ | 15.1 | 70 |
| | | BV(IV)W$_{11}$O$_{40}^{7-}$ | 15.1 | 64 |
| | | SiW$_{11}$O$_{39}^{8-}$ | 14.8 | 34 |
| | | BCuW$_{11}$O$_{39}^{7-}$ | 14.8 | 32 |
| | | BCo(II)W$_{11}$O$_{39}^{7-}$ | 14.5 | — |

It is intended that the foregoing description be only illustrative of the present invention and that the present invention be limited only by the hereinafter appended claims.

We claim:

1. An intercalated uniform crystalline layered double hydroxide clay composition conforming to the formula [M$_{1-x}^{II}$M$_x^{III}$(OH)$_2$]A$_{x/n}^{n-}$·yH$_2$O wherein M$^{II}$ is a divalent metal and M$^{III}$ is a trivalent metal, A is polyoxometalate anion of charge n−, x is between 0.12 and 0.8, and provides pillar height greater than about 9 Angstroms and an X-ray diffraction basal spacing value greater than about 14 Angstroms.

2. The intercalated crystalline layered double hydroxide clay composition according to claim 1, characterized in that the polyoxometalate anion A is selected from isopolyoxometalate anions of general formula [M$_m$O$_y$]$^{p-}$ or heteropolyoxometate anions of general formula, [X$_x$M$_m$O$_y$]$^{p-}$, where M is a transition metal and X is hetero atom which can be a metal, non-metal, and m, y, x and p are positive whole numbers.

3. The intercalated crystalline layered double hydroxide clay composition according to claim 2, characterized in that the dipositive ion M$^{II}$ is zinc and the tripositive ion M$^{III}$ is aluminum.

4. The intercalated crystalline layered double hydroxide clay composition according to claim 3, characterized in that the polyoxometalate anion A is selected from the group consisting of H$_2$W$_{12}$O$_{42}^{10-}$, PV$_{14}$O$_{42}^{9-}$ and NaP$_5$W$_{30}$O$_{110}^{14-}$.

5. The intercalated crystalline layered double hydroxide clay composition according to claim 3, characterized in that the polyoxometalate anion A is a Keggin-type structure selected from the group consisting of alpha-[H$_2$W$_{12}$O$_{40}$]$^{6-}$, alpha-[SiV$_3$W$_9$O$_{40}$]$^{7-}$, BV(IV)W$_{11}$O$_{40}^{7-}$, SiFe(III) (SO$_3$)W$_{11}$O$_{39}^{7-}$, BV(v)W$_{11}$O$_{40}^{6-}$ and PV$_3$W$_9$O$_{40}^{6-}$.

6. The intercalated crystalline layered double hydroxide clay composition according to claim 3, characterized in that the polyoxometalate anion A is a lacunary (defect) Keggin-type structure selected from the group consisting of PMo$_2$W$_9$O$_{39}^{7-}$, BCo(II)W$_{11}$O$_{39}^{7-}$, BCu(II)W$_{11}$O$_{39}^{7-}$, SiW$_{11}$O$_{39}^{8-}$, BW$_{11}$O$_{39}^{9-}$, PW$_9$O$_{34}^{9-}$, BCo(III)W$_{11}$O$_{39}^{6-}$ and PCu(II)W$_{11}$O$_{39}^{5-}$.

7. The intercalated crystalline layered double hydroxide clay composition according to claim 2, characterized in that the dipositive ion M$^{II}$ is magnesium and the tripositive ion M$^{III}$ is aluminum.

8. The intercalated crystalline layered double hydroxide clay composition according to claim 7, characterized in that the polyoxometalate anion A is a Keggin-type structure selected from the group consisting of alpha-[H$_2$W$_{12}$O$_{40}$]$^{6-}$, alpha-[SiV$_3$W$_9$O$_{40}$]$^{7-}$, BV(IV)W$_{11}$O$_{40}^{7-}$, SiFe(III) (SO$_3$)W$_{11}$O$_{39}^{7-}$, BV(v)W$_{11}$O$_{40}^{6-}$ and PV$_3$W$_9$O$_{40}^{6-}$.

9. The intercalated crystalline layered double hydroxide clay composition according to claim 7, characterized in that the polyoxometalate anion A is a lacunary Keggin-type structure selected from the group consisting of [PMo$_2$W$_9$O$_{39}$]$^{7-}$, BCo(II)W$_{11}$O$_{39}^{7-}$, BCu(II)W$_{11}$O$_{39}^{7-}$, SiW$_{11}$O$_{39}^{8-}$, BW$_{11}$O$_{39}^{9-}$, PW$_9$O$_{34}^{9-}$, BCo(III)W$_{11}$O$_{39}^{6-}$ and PCu(II)W$_{11}$O$_{39}^{5-}$.

10. The intercalated crystalline layered double hydroxide clay composition according to claim 7, characterized in that the polyometalate anion A is selected from the group consisting of H$_2$W$_{12}$O$_{42}^{10-}$, PV$_{14}$O$_{42}^{9-}$ and NaP$_5$W$_{30}$O$_{110}^{14-}$.

11. A process for preparing an intercalated crystalline layered double hydroxide clay composition conforming to the formula [M$_{1-x}^{II}$M$_x^{III}$(OH)$_2$]A$_{x/n}^{n-}$·yH$_2$O wherein M$^{II}$ is a divalent metal and M$^{III}$ is a trivalent metal, A is polyoxometalate anion charge n−, and x is between 0.14 and 0.8, and y is a positive number comprising:

(a) adding a hot slurry with a temperature between about 50° and 100° C. containing a layered double hydroxide material conforming to the formula, [M$_{1-z}^{II}$M$_z^{III}$(OH)$_2$]B$_z$·yH$_2$O, wherein B is a monovalent anion selected from the group consisting of NO$_3^-$, Cl$^-$, and z is between 0.14 and 0.8, wherein the layered double hydroxide material is formed and used without drying in water which contains the dissolved polyoxometalate anion A$^{n-}$ whereby B is substituted by the polyoxymetalate anion; and (b) recovering the composition.

12. The process of claim 11 wherein the polyoxometalate anion A is the Keggin-type structure selected from the group consisting of alpha -$[H_2W_{12}O_{40}]^{6-}$, alpha -$[SiV_3W_9O_{40}]^{7-}$, $BV(IV)W_{11}O_{40}^{7-}$, $SiFe(III)(SO_3)W_{11}O_{39}^{7-}$, $BV(v)W_{11}O_{40}^{6-}$ and $PV_3W_9O_{40}^{6-}$.

13. The process of claim 11 wherein the polyoxometalate anion A is a lacunary Keggin-type structure selected from the group consisting of $PMo_2W_9O_{39}^{7-}$, $BCo(II)W_{11}O_{39}^{7-}$, $BCu(II)W_{11}O_{39}^{7-}$, $SiW_{11}O_{39}^{8-}$, $BW_{11}O_{39}^{9-}$, $PW_9O_{34}^{9-}$, $BCo(III)W_{11}O_{39}^{6-}$ and $PCu(II)W_{11}O_{39}^{5-}$.

14. The process of claim 11 wherein the polyoxometalate anion A is selected from the group consisting of $H_2W_{12}O_{42}^{10-}$, $PV_{14}O_{42}^{9-}$ and $NaP_5W_{30}O_{110}^{14-}$.

15. A process for the preparation of an LDH of the formula $[Mg_{1-x}Al_x(OH)_2](OH)_x \cdot yH_2O$, wherein x is between 0.12 to 0.8 and y is a positive number, comprising:
  (a) calcining the hydrotalcite material with the composition conforming to the formula $[Mg_{1-x}Al_x(OH)_2](CO_3)_{x/2} \cdot yH_2O$ at an elevated temperature preferably to a temperature up to about 500° C. to provide a calcined material; and
  (b) hydrolyzing the calcined material in degassed water under a $CO_2$ free atmosphere to form the LDH having a gallery anion which is hydroxide ion.

16. A process for the preparation of a LDH sorbent conforming to the formula, $[M_{1-x}^{II}M_x^{III}(OH)_2]A_{x/n}^{n-} \cdot yH_2O$ wherein $M^{II}$ is a divalent metal and $M^{III}$ is a trivalent metal, A is a polyoxometalate anion of charge n−, and x is between 0.14 and 0.18 and y is between 0 to 8, comprising:
  (a) exchanging a gallery OH− ion in an LDH of the formula $[Mg_{1-x}Al_x(OH)_2](OH)_x \cdot yH_2O$, wherein the intermediate LDH is formed and used without drying, with polyoxoanions in an aqueous solution by mixing an aqueous slurry of the LDH in water and an aqueous solution of polyoxomatalate anion A, wherein the process is conducted in the absence of carbon dioxide; and
  (b) isolating the LDH sorbent.

17. A process of claim 16 wherein the exchange of gallery OH− anions in an LDH of the formula $[Mg_{1-x}Al_x(OH)_2](OH)_x \cdot yH_2O$ is carried out by mixing the said LDH in a mixture of a swelling agent and water, and an aqueous solution containing the polyoxometalate anion.

18. The process of claims 16 and 17 wherein the polyoxometalate anion A is a Keggin-type structure selected from the group consisting of alpha-$[H_2W_{12}O_{40}]^{6-}$, alpha-$[SiV_3W_9O_{40}]^{7-}$, and $BV(IV)W_{11}O_{40}^{7-}$.

19. The process of claims 16 and 17 wherein the polyoxometalate anion A is a lacunary Keggin-type structure selected from the group consisting of $[PMo_2W_9O_{39}]^{7-}$, $BCo(II)W_{11}O_{39}^{7-}$, $BCu(II)W_{11}O_{39}^{7-}$, $SiW_{11}O_{39}^{8-}$, $BW_{11}O_{39}^{9-}$ and $PW_9O_{34}^{9-}$.

20. The process of claims 16 and 17 wherein the polyoxometalate anion A is selected from the group consisting of $H_2W_{12}O_{42}^{10-}$, $PV_{14}O_{42}^{9-}$ and $NaP_5W_{30}O^{14-}$.

21. The process of claim 17, wherein the said swelling agent is selected from the group consisting of an ethyl alcohol, a polyether, a polyalcohol and a polyether.

22. The process of claim 21, wherein the said polyalcohol swelling agent is glycerol.

23. The process of claim 17, wherein the said mixture of swelling agent and water contained in the range 1:1 to 4:1 by volume, preferably in a range 1:1 to 1:2.

* * * * *

UNITED STATES PATENT AND TRADEMARK OFFICE
CERTIFICATE OF CORRECTION

PATENT NO. : 5,079,203
DATED : January 7, 1992
INVENTOR(S) : Thomas J. Pinnavaia, Taehyun Kwon, Emmanuel D. Dimotakis and Jayantha Amarasekera It is certified that error appears in the above—identified patent and that said Letters Patent is hereby corrected as shown below:

Face page, Abstract, last line, "$\geq 14Å$" should read -- $\geq 14Å$ --.

Column 1, line 55, "Keggintype" should be --Keggin-type--.

Column 2, line 19, "an" before "another" should be deleted.

Column 4, line 24, "seiving" should be --sieving--.

Column 4, line 33, "$\geq 14Å$" should read -- $\geq 14Å$ --.

Column 5, line 25, "The. po-" should read --The po- --

Column 5, line 49, before "week", --a-- should be inserted.

Column 5, line 55, after "showed", "a" should be deleted.

Column 7, line 23, "posses" should be --possess--.

Column 8, line 1, before "basal", "a" should be deleted.

Column 9, lines 55 and 56, "Keggintype" should be --Keggin-type--.

Column 10, line 26, "This" should be --These--.

UNITED STATES PATENT AND TRADEMARK OFFICE
CERTIFICATE OF CORRECTION

PATENT NO. : 5,079,203

DATED : January 7, 1992

INVENTOR(S) : Thomas J. Pinnavaia, Taehyun Kwon, Emmanuel D. Dimotakis and Jayantha Amarasekera It is certified that error appears in the above—identified patent and that said Letters Patent is hereby corrected as shown below:

Column 10, line 43, the comma "," after "of" should be deleted.

Column 12, line 22, a period --.-- should be inserted after "Å" and before "Chemical".

Column 12, line 40, "suspention" should be --suspension--.

Column 12, line 48, "describe" should be --describes--.

Column 12, line 53, "solutions" should be --solution--.

Column 14, line 2 (Claim 2), "heteropolyoxometate" should be --heteropolyoxometalate--.

Column 14, line 68 (Claim 11), "polyoxymetalate" should be --polyoxometalate--.

Column 16, line 4 (Claim 16), "polyoxomatalate" should be --polyoxometalate--.

UNITED STATES PATENT AND TRADEMARK OFFICE
CERTIFICATE OF CORRECTION

PATENT NO. : 5,079,203

DATED : January 7, 1992

INVENTOR(S) : Thomas J. Pinnavaia, Taehyun Kwon, Emmanuel D. Dimotakis and Jayantha Amarasekera It is certified that error appears in the above-identified patent and that said Letters Patent is hereby corrected as shown below:

Column 16, line 4 (Claim 16), "polyoxomatalate" should be --polyoxometalate--.

Signed and Sealed this

Twentieth Day of July, 1993

Attest:

MICHAEL K. KIRK

Attesting Officer    Acting Commissioner of Patents and Trademarks